US008219753B2

(12) United States Patent
Bumap et al.

(10) Patent No.: US 8,219,753 B2
(45) Date of Patent: Jul. 10, 2012

(54) RESOURCE MANAGEMENT CACHE TO MANAGE RENDITIONS

(75) Inventors: Steve Bumap, Walnut Creek, CA (US); Joshua Shagam, San Francisco, CA (US); Steve Szabo, San Francisco, CA (US); Nicholas Trotta, San Francisco, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 498 days.

(21) Appl. No.: 12/502,049

(22) Filed: Jul. 13, 2009

(65) Prior Publication Data

US 2011/0010505 A1    Jan. 13, 2011

(51) Int. Cl.
  *G06F 12/00* (2006.01)
  *G06F 13/00* (2006.01)
(52) U.S. Cl. ......... 711/118; 711/100; 711/117; 711/154
(58) Field of Classification Search .................. 711/100, 711/117, 118, 154
  See application file for complete search history.

(56) References Cited

U.S. PATENT DOCUMENTS

| 6,601,090 | B1 |   | 7/2003 | Gurijala et al. |         |
|-----------|----|---|--------|-----------------|---------|
| 6,785,784 | B1 | * | 8/2004 | Jing et al.     | 711/154 |
| 7,177,782 | B2 | * | 2/2007 | Falik et al.    | 702/189 |
| 2003/0115421 | A1 |   | 6/2003 | McHenry et al. |       |
| 2004/0044731 | A1 |   | 3/2004 | Chen et al. |          |
| 2005/0125533 | A1 |   | 6/2005 | Svanbro et al. |       |
| 2008/0016286 | A1 |   | 1/2008 | Temple |              |

FOREIGN PATENT DOCUMENTS

WO    WO2007072670    6/2007

OTHER PUBLICATIONS

Mehmet Umut Demircin, "Robust Video Streaming over Time-Varying Wireless Networks", Georgia Institute of Technology, Aug. 2008. pp. 1-109.
http://cachefx.com/centralized-storge-caching Gear6 "What is Centralized Storage Caching" pp. 1-2.
Wang et al. "Distributed Caching and Adaptive Search in Multilayer P2P Networks" , Distributed Computing Sytems, 2004, Proceeding, 24th International Conference pp. 219-226.

* cited by examiner

*Primary Examiner* — Tuan V. Thai
(74) *Attorney, Agent, or Firm* — Trellis IP Law Group, PC (57) ABSTRACT

A resource management cache of a computing device receives a request for an item. The item may include any type of content, such as an image or a video. A rendition for the item is determined. The item may be stored in a plurality of renditions for retrieval. The resource management cache can send one or more requests to one or more sources for the rendition. The sources may include remote sources and also a local source. If a source responds with an indication the rendition is available, the rendition is sent to and received at the computing device. If no sources respond with an indication the rendition is available, the resource management cache may send a message asking if a source can generate the rendition from another rendition of the item. The rendition may be generated and it is sent to and received at the resource management cache.

20 Claims, 5 Drawing Sheets

RESOURCE MANAGEMENT CACHE TO MANAGE RENDITIONS

BACKGROUND

Particular embodiments generally relate to computing and more specifically to resource cache management.

The use of cache allows applications to retrieve data in a quicker fashion than retrieving data from a database. Typically, an application would determine where and how to obtain the data from the cache. That is, the application determines where the data is stored, such as in cache or a database, and requests the data from the cache or database. The cache does not participate in this decision and leaves it up to the application to determine where to retrieve the data.

SUMMARY

Particular embodiments generally relate to a resource management cache. In one embodiment, a resource management cache of a computing device receives a request for an item. The item may include any type of content, such as an image, a video, or other information. A rendition for the item is determined. A rendition may be a representation of the item, such as a thumbnail, a version re-sized for display on a television, or other representations. The item may be stored in a plurality of renditions for retrieval. The resource management cache can send one or more requests to one or more sources for the rendition. The sources may include remote sources and also a local source. If a source responds with an indication the rendition is available, the rendition is sent to and received at the computing device. If no sources respond with an indication the rendition is available, the resource management cache may send a message asking if a source can generate the rendition from another rendition of the item. For example, a thumbnail may be created from the full version of the item. The rendition may be generated and it is sent to and received at the resource management cache.

A further understanding of the nature and the advantages of particular embodiments disclosed herein may be realized by reference of the remaining portions of the specification and the attached drawings.

DETAILED DESCRIPTION OF EMBODIMENTS

Figure 1:
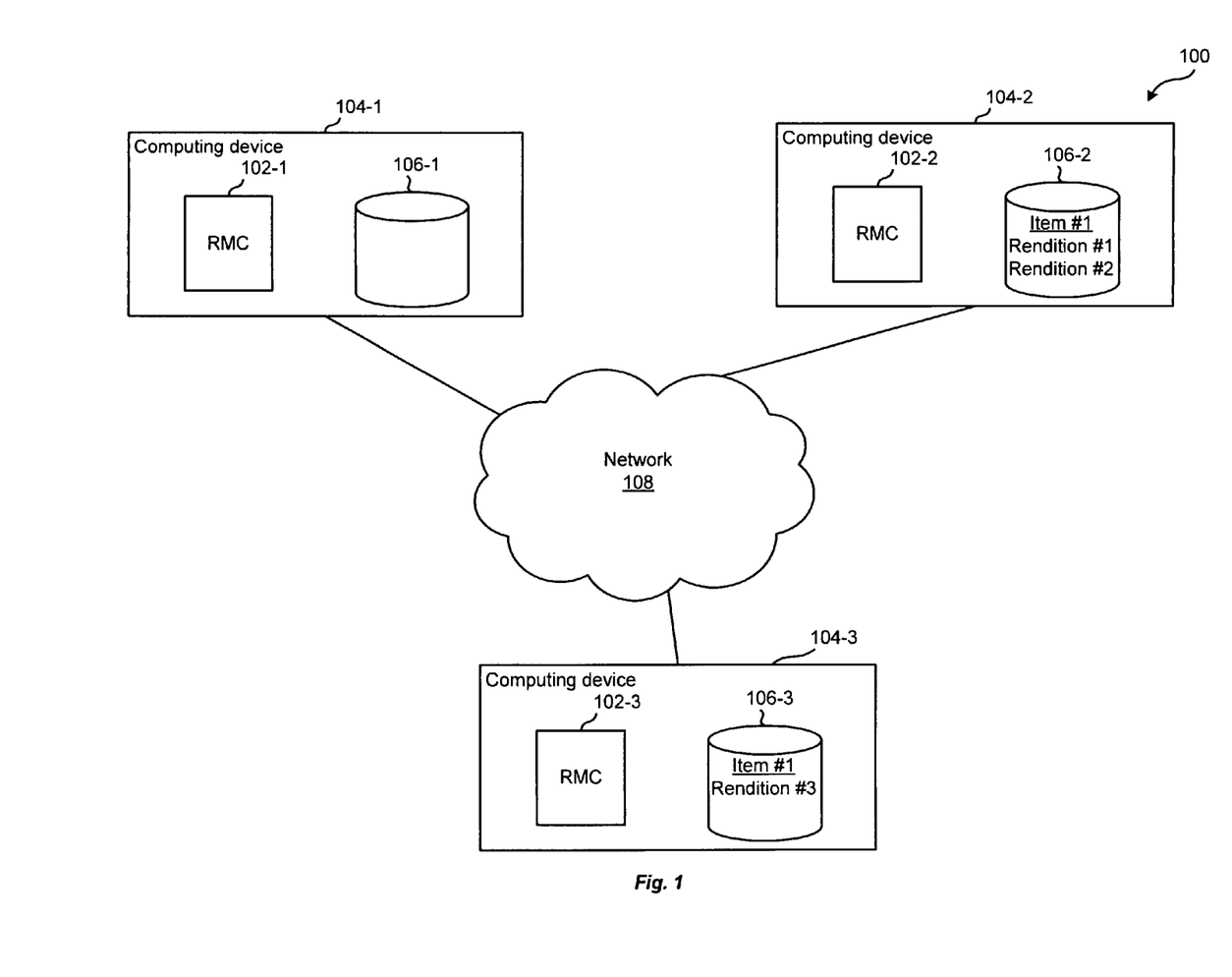
FIG. 1 depicts a simplified system for providing a resource management cache according to one embodiment.

FIG. 1 depicts a simplified system 100 for providing a resource management cache (RMC) 102 according to one embodiment. System 100 includes a plurality of computing devices 104. Each computing device 104 may include a resource management cache 102; however, it will be recognized that not every computing device 104 may include a resource management cache 102. Not having a resource management cache 102 in a computing device 104 does not mean a source 106 cannot be accessed by another resource management cache 102 of another computing device.

Computing devices 104 may be a variety of different computing devices. For example, computing devices 104 may be different consumer electronic device, such as cellular phones, laptop computers, personal computers, set top boxes, smart phones, tablet computers, electronic readers, or other electronic devices. It will be understood that computing devices 104 may be portable or fixed computing devices.

Computing devices 104 may communicate through a network 108. Network 108 may be a home network where computing devices 104 connect to each other through the home network. In other embodiments, network 108 may include a wide area network (WAN). Network 108 may be a wireless or wired network also.

Computing devices 104 may include storage sources 106. A storage source 106 may be any storage device that can store data. For example, storage sources 106 may be cache memory. Cache may be storage in which data is stored that duplicates the original value of data that is stored elsewhere. Cache typically allows faster access to the duplicated data. Also, storage sources 106 may include other storage devices, such as a read-only memory (ROM), random access memory (RAM), a database, disk drive, or other storage devices.

Resource management cache 102 is configured to manage different renditions of an item or a collection of items. A rendition may be any representation of content. The rendition may be an original copy of the content and any other representations, such as a different version of the content or a different format of the content. Examples of different renditions may be a representative thumbnail of the content, a version of the content re-sized for a display, or a compressed version of the content.

Resource management cache 102 manages the renditions on devices. In one embodiment, resource management cache 102 takes resources from a remote source and stores them within a local storage source 106. Also, resource management cache 102 can also manage renditions of items that are stored within the local storage source 106. It will be understood that resource management cache 102 of any computing devices 104 may manage the renditions. Different renditions may be stored to allow transfer of them among computing devices 104. For example, it may be desirable to transfer renditions among computing devices 104 instead of the original content. Resource management cache 102 may provide guidance to other computing devices for which renditions to keep and how to obtain the renditions. For example, resource management cache 102 may determine what would be the most efficient renditions to store in different storage sources 106. Then, when a request for an item is received, resource management cache 102 then can determine how the renditions should be obtained.

Another function of resource management cache 102 is processing requests for items. For example, an application/computing device may request an item. Resource management cache 102 may determine which rendition should be requested for the item. For example, rules may be used to determine which rendition would be the most efficient to request. In one example, a computing device 104 with less computing power/resources may require a thumbnail rendition rather than the full copy of the item. Resource management cache 102 can then determine if the rendition is available from a local source or a remote source 106. If the rendition is available, resource management cache 102 can request it or if the rendition is not available, resource management cache 102 can then determine how the rendition can be generated.

Resource management cache 102 may also track how much storage space is being used by renditions that have been retrieved and generated and also the total available space. Resource management cache 102 can then determine which renditions to remove based on one or more rules. For example, different renditions may be expired when total space available is reduced below a threshold or when a requested rendition would exceed the total storage space.

Figure 2:
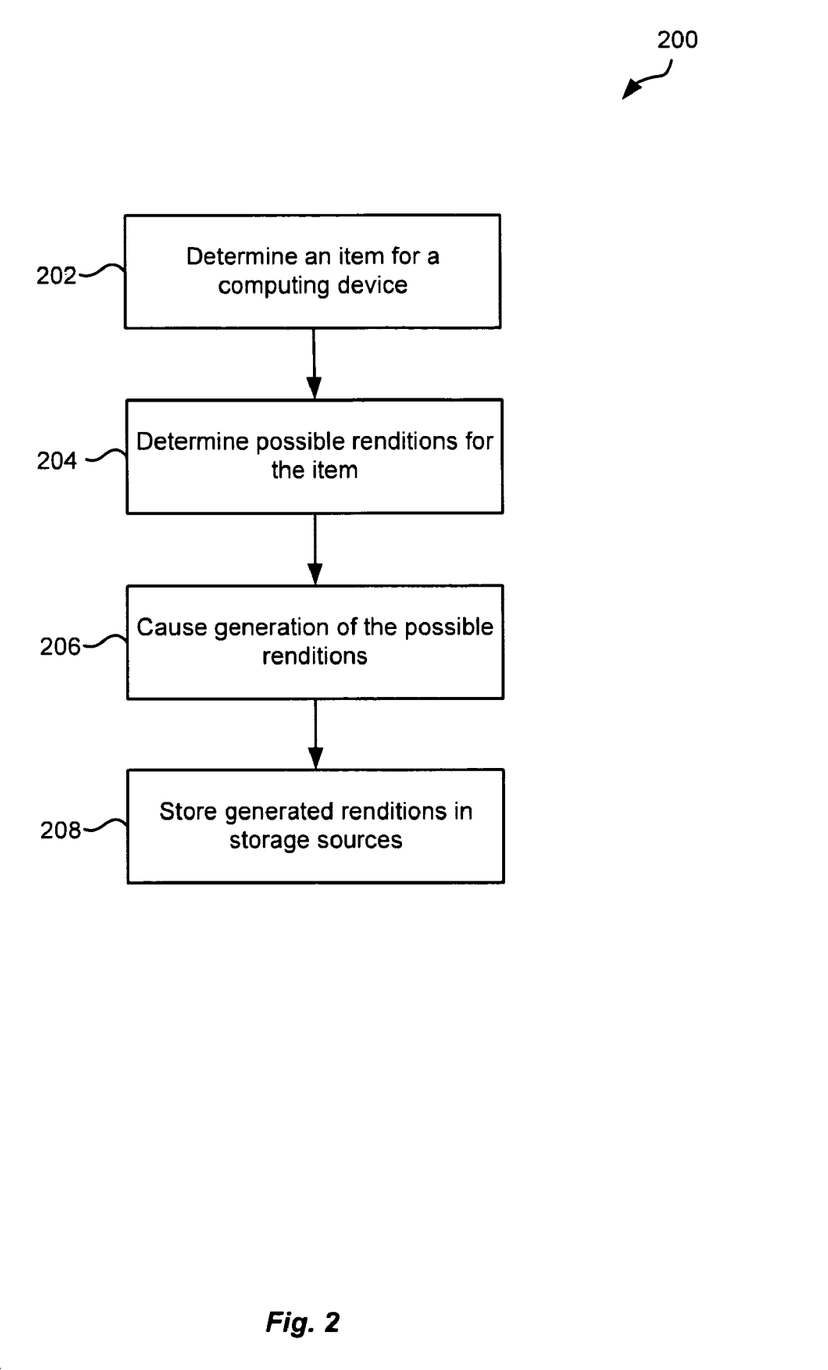
FIG. 2 depicts a simplified flowchart for providing guidance for storing renditions according to one embodiment.
Figure 3:
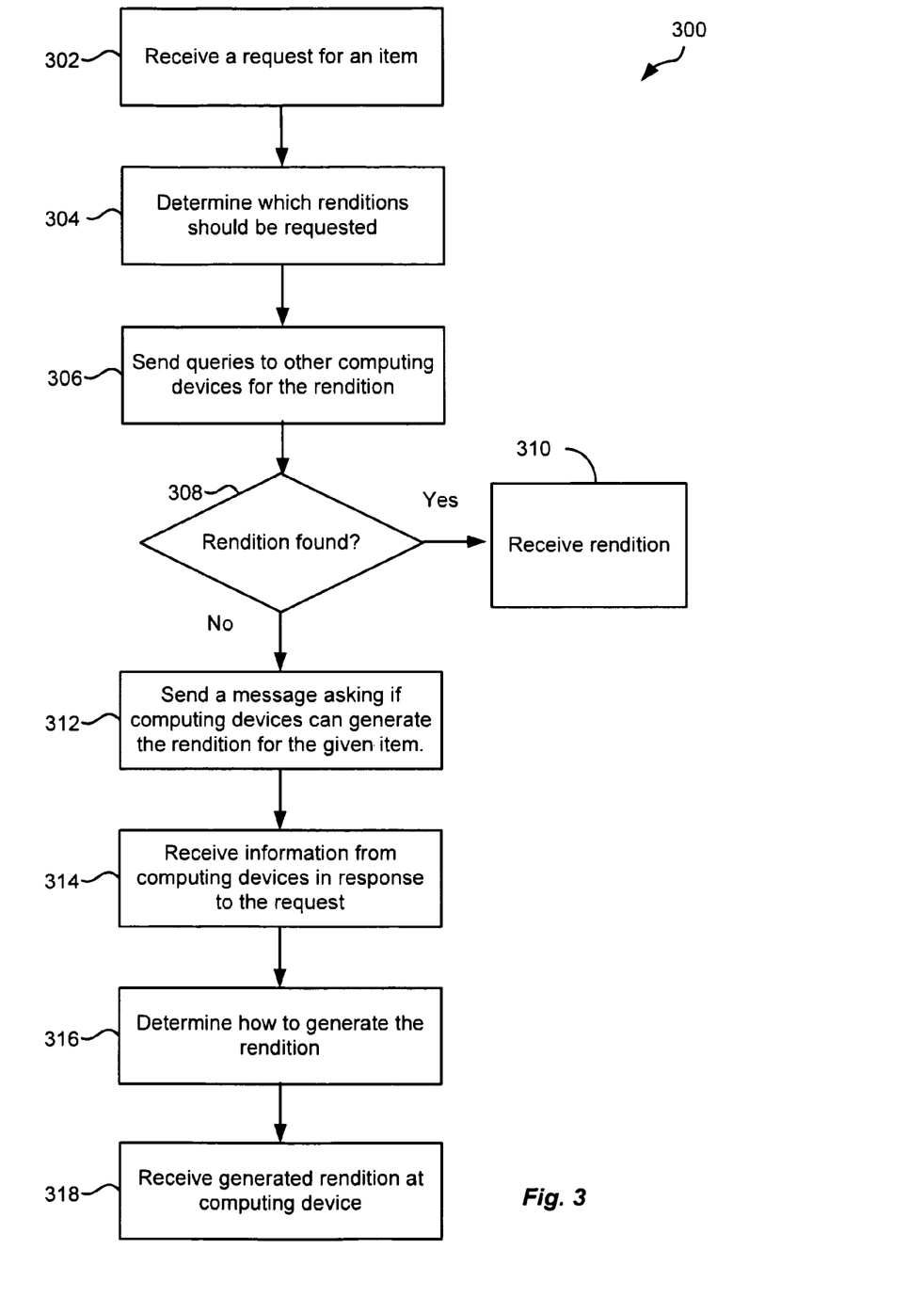
FIG. 3 depicts a simplified flowchart for processing requests for renditions according to one embodiment.
Figure 4:
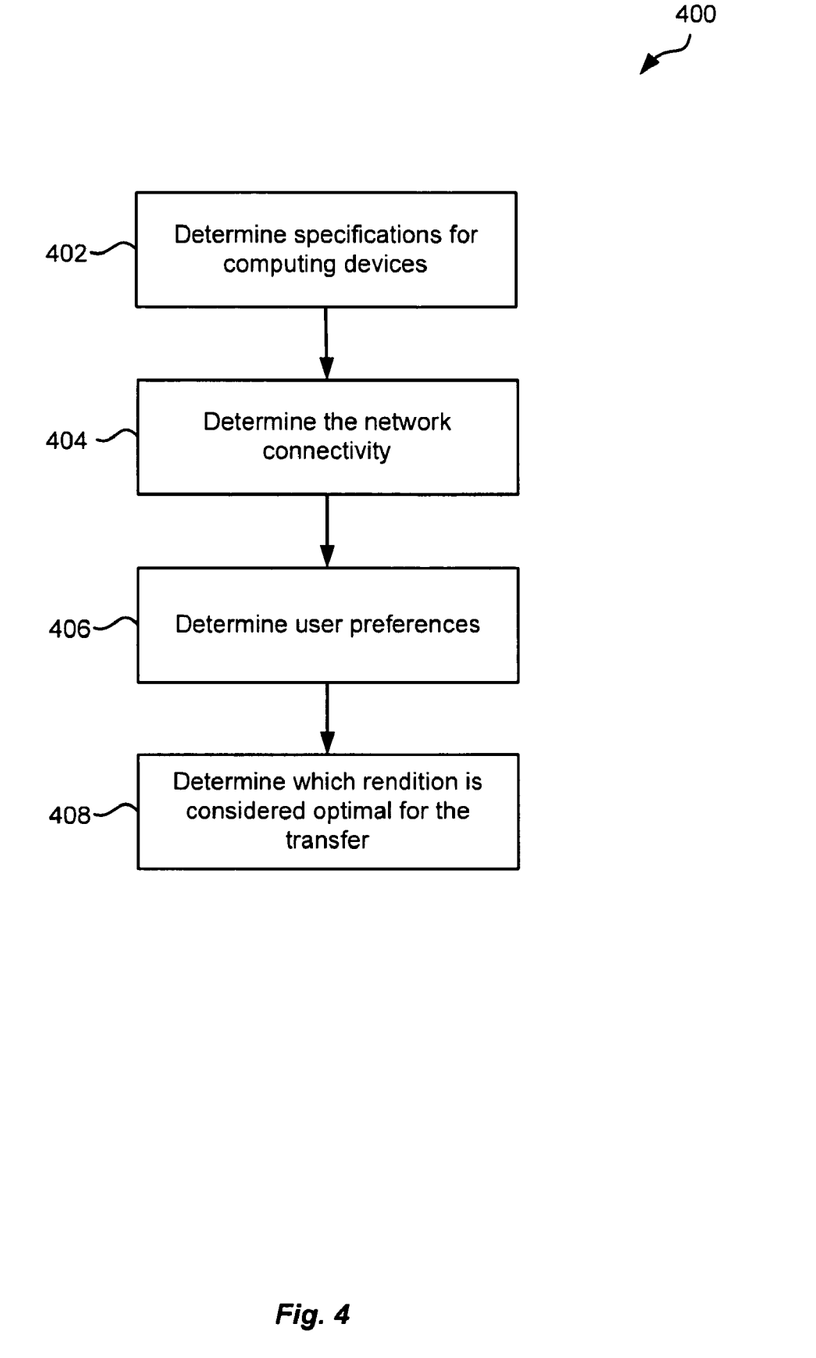
FIG. 4 depicts a simplified flowchart for determining which rendition to transfer according to one embodiment.
Figure 5:
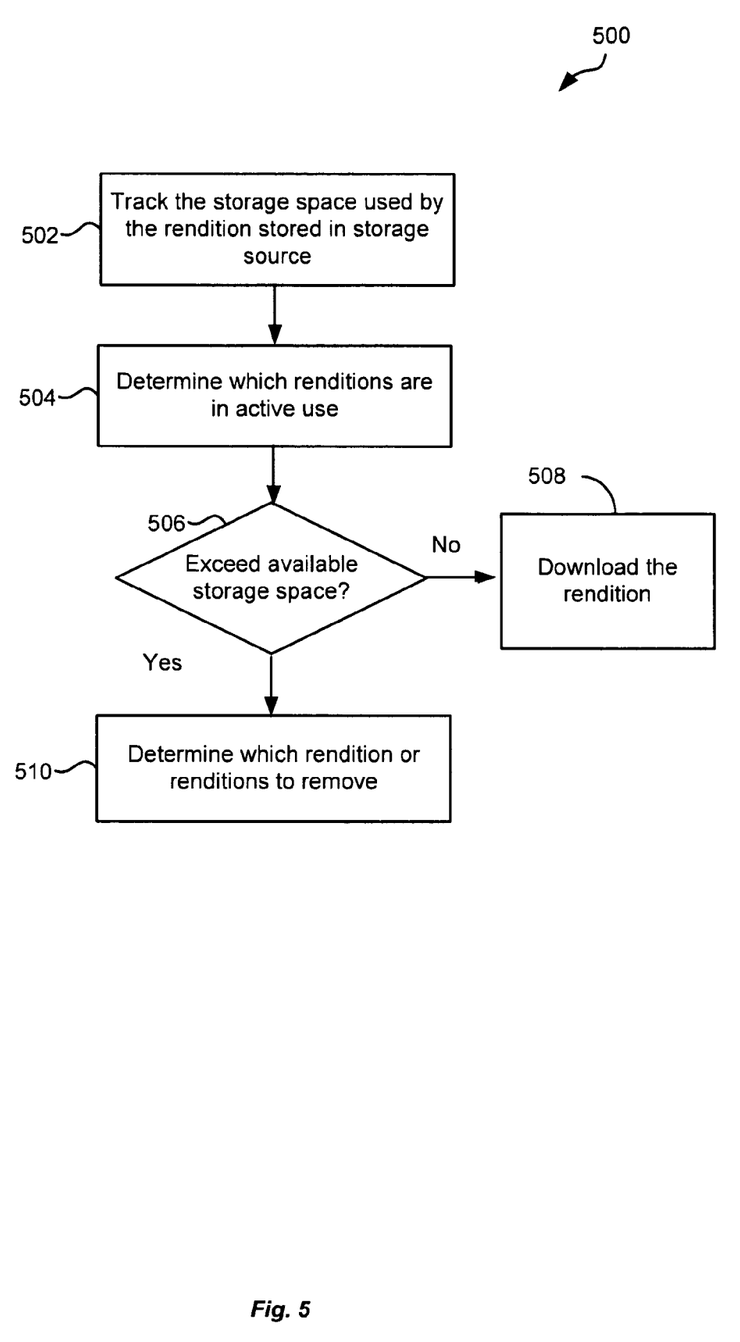
FIG. 5 depicts a simplified flowchart of a method for determining which resources to remove according to one embodiment.

The above functions will now be described in more detail below. FIG. 2 describes the providing of guidance for storing renditions. FIG. 3 describes processing requests for items. FIG. 4 describes determining which rendition to transfer. FIG. 5 discloses removing renditions.

FIG. 2 depicts a simplified flowchart 200 for providing guidance for storing renditions according to one embodiment. The guidance may be provided by resource management cache 102. For example, resource management cache 102-1 of computing device 104-1 may provide the guidance to other computing devices 104-2 and 104-3 or to a local source.

In step 202, resource management cache 102 determines an item for a computing device 104. In providing guidance for storing renditions, resource management cache 102 may discover various items that are being stored in various computing devices 104. For example, all or part of items stored in devices that have been discovered in home network 108 are analyzed.

In step 204, resource management cache 102-1 determines possible renditions for the item that can be generated. The possible renditions for the item may be determined based on the type of item. For example, if the item is a video, then a thumbnail rendition may be generated. Also, a resized rendition of the video, such as a lower quality copy, may be determined such that it can be displayed on different devices. Rules may be used to determine which renditions to generate. The rules may be focused on providing the most seamless environment for a user. For example, thumbnail images may be generated for videos to allow for easy and quick transfer of the thumbnails when an item is requested.

In step 206, resource management cache 102-1 causes generation of the possible renditions. In one embodiment, different computing devices 104 may be contacted to generate the different renditions. For example, as shown in FIG. 1, computing device 104-2 may generate rendition #1 and rendition #2. Also, computing device 104-3 may generate rendition #3.

Rules may be used to determine which computing devices 104 should be used to generate different renditions. For example, the different processing power of computing devices 104-2 and 104-3 may be factors used to determine which renditions should be generated. If computing device 104-2 includes a powerful graphics processor, then graphic-intensive renditions can be generated using computing device 104-2. Storage requirements for the different computing devices 104 may also be taken into account. For example, if computing device 104-2 has larger storage space, then renditions that take a larger amount of storage space may be generated on computing device 104-2. Other factors may also be used, such as renditions may be stored on computing devices 104 that may be more likely to use the renditions. For example, a digital camera may be more likely to use thumbnail renditions.

In step 208, the generated renditions are stored in storage sources 106. In one embodiment, renditions may be transferred to other computing devices 102. For example, storage source 106-1 may be cache that is used as a repository for renditions that are generated. Also, devices with more storage space may store larger amounts of renditions.

After determining and generating the possible renditions, requests for renditions may be received. It will be understood that requests for items may also be received before generation of any or all renditions. However, resource management cache 102 may attempt to have renditions generated before requests are received, which may speed up transfer of renditions. FIG. 3 depicts a simplified flowchart 300 for processing requests for renditions according to one embodiment. The requests may be processed by any of the resource management caches 102.

In step 302, resource management cache 102-1 receives a request for an item. The request for an item may be received from an application running on computing device 104-1 or any other computing device. Resource management cache 102-1 provides an interface between the application and multiple storage sources 106. The request may be for the original content or it may be for a specific rendition.

In step 304, resource management cache 102-1 determines which renditions should be requested. The renditions that should be requested may be based on a set of rules. As will be described in further detail below, the computing device specifications, the network, user preferences, or storage availability may be taken into account.

In step 306, resource management cache 102-1 sends queries to other computing devices 104 for the rendition. The query may be a message that is broadcast on network 108 and is received at other computing devices 104 that are connected to the network. For example, all computing devices currently connected to a home network may be contacted. Also, devices connected to other networks may be contacted, such as a cellular phone through a cellular network.

The message may be received at other resource management caches 102. In other embodiments, a processor of computing device 104 may receive the message and process it instead of resource management cache 102. Thus, computing devices 104 do not need to have resource management caches to process the query.

Step 308 determines if the rendition was found. If the rendition is found, step 310 accesses the rendition. For example, the rendition may be requested and it is subsequently sent to resource management cache 102-1. Also, if local source 106-1 is storing the rendition, the rendition may be accessed from the local source.

If the rendition is not found, resource management cache 102 may attempt to have the rendition generated. In step 312, resource management cache 102-1 sends a message asking if computing devices 104 can generate the rendition for the given item. In step 314, resource management cache 102-1 receives information from computing devices 104 in response to the request. The information may be used by resource management cache 102-1 to determine how the rendition can be generated. For example, the computing devices' capabilities may be received in addition to the renditions that are currently being stored.

In step 316, resource management cache 102-1 determines how to generate the rendition. For example, resource management cache 102-1 may determine that a computing device 104-3 has the correct rendition and computing resources to generate the requested rendition. Also, resource management cache 102-1 may determine that a rendition on computing device 104-2 should be transferred to computing device 104-3 such that computing device 104-3 can generate the requested rendition. For example, computing device 104-3 may have the required computing resources to generate the requested rendition if it has another rendition that is being stored on computing device 104-2. Different scenarios may be provided to have the requested rendition generated. The key is that resource management cache 102-1 is in communication with other computing devices 104 that know how to generate a requested rendition.

In step 318, the rendition may be generated and is received at computing device 104-1. For example, computing device 104-3 may generate the rendition and send it to computing device 104-1. When a rendition is received, a handle or identifier may be attached to it. This may be used for the lifetime of the rendition to identify it. To ensure that the rendition is not removed from storage source 106-1 by another request, a tag may be set for the rendition to not remove it unless certain rules are met.

FIG. 4 depicts a simplified flowchart 400 for determining which rendition to transfer according to one embodiment. In step 402, resource management cache 102-1 determines specifications for computing devices 104. The device specifications may be requested from other computing devices 104. Also, resource management cache 102-1 may already have the device specifications for other computing devices 102. For example, the specifications may have been determined during a discovery process.

In step 404, resource management cache 102-1 determines the network connectivity. For example, computing devices 104 may be available over different networks. In one example, computing device 104-2 may be available over a network that has less bandwidth available than computing device 104-3. Having less bandwidth available may be less desirable if large amounts of information need to be transferred.

In step 406, user preferences are determined. A user may configure rules that state which renditions should be downloaded if possible and which computing devices 104 should be used. For example, a list of preferred renditions and/or computing devices may be provided. The list may state full copies should be downloaded if using a high speed network, thumbnails if the network speed is below a threshold, or may include any other rules.

In step 408, resource management cache 102-1 determines which rendition is considered optimal for the transfer. This may be performed by applying the information determined above in accordance with different rules.

FIG. 5 depicts a simplified flowchart 500 of a method for determining which resources to remove according to one embodiment. When storage space in storage source 106 is exhausted or becomes low, resource management cache 102-1 determines which renditions should be removed. A policy may be used to determine which items to remove.

In step 502, resource management cache 102-1 tracks the storage space used by the rendition stored in storage source 106-1. For example, the available storage space may be tracked.

In step 504, resource management cache 102-1 determines which renditions are in active use. For example, renditions that have been actively used or are being retrieved by other computing devices 104 should not be deleted.

In step 506, it is determined if a request to retrieve a rendition would exceed the available storage space. If not, step 508 downloads the rendition. If the rendition would exceed the available space, step 510 determines which rendition or renditions to remove. The renditions that are being stored in storage source 106-1 may be scored based on different criteria. For example, items that have not been locked (e.g., in active use or have a flag set) may be scored and the lowest scored items or renditions are deleted first.

The policy may include different rules, such as age, last use, the number of uses, the resource type, and size. The age may be scored based on the age of the rendition or on the first time the rendition was used. The last use may be scored based on how recently the rendition was used or the most recent time the rendition was used. The number of uses may be scored based on the number of times a rendition was used or on a count of the number of requests for the rendition. The resource type may be scored based on the resource type. For example, certain types of renditions may be more valuable to keep than others. In one example, it may be desirable to keep the original copy of the item and thumbnails of the item instead of a re-sized version of the item. The size of the item may be used in scoring based on the amount of space the rendition takes up. For example, smaller items may be deleted first because they may be easier to regenerate.

In conclusion, resource management cache 102 manages which renditions should be stored by various computing devices 102. This allows an intelligent cache that can manage different renditions that can be generated for an item. By intelligently storing and generating renditions among different computing devices, a network of devices may be used to request different items. The renditions may be stored on different computing devices that may be optimally configured to store the renditions. However, any computing device connected to the network may have access to these renditions.

Although the description has been described with respect to particular embodiments thereof, these particular embodiments are merely illustrative, and not restrictive. Although a cache management device is described, it will be understood that management of all storage devices can be performed.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
   receiving, at a resource manager cache of a first computing device, a request for an item, wherein a plurality of computing devices comprises the first and a second computing device;
   determining, by the resource manager cache, a rendition for the item that should be requested from a plurality of renditions for the item, the rendition being a representation of the item, wherein the plurality of renditions are determined based on a type of the item;
   sending, by the resource manager cache, one or more requests to one or more sources for the rendition, wherein the one or more sources are chosen from among a plurality of sources on the plurality of computing devices;
   if a source from the one or more sources responds with an indication that the rendition is available, accessing the rendition by the computing device;
   if no sources from the one or more sources respond with an indication that the rendition is available, performing:
   determining a source from the one or more sources for generating the rendition by using rules to determine that the second computing device having the determined source thereon is capable of generating the rendition;
   sending, by the first computing device, a message asking if the determined source can generate the rendition from another rendition of the item; and
   receiving the rendition if the determined source generated the rendition from another rendition of the item.

2. The method of claim 1, further comprising sending a guidance message to a source in the one or more sources providing guidance on which renditions of items to store on the one or more sources.

3. The method of claim 2, further comprising providing information to the source on how to obtain the renditions of items to store.

4. The method of claim 3, wherein obtaining the renditions comprises retrieving the renditions from another source or generating of the renditions by the source.

5. The method of claim 2, wherein the guidance is provided before the request for the item is received.

6. The method of claim 1, further comprising:
   monitoring available storage space for the computing device;
   determining which renditions that are stored should be deleted based on the available storage space; and
   deleting the determined renditions.

7. The method of claim 6, wherein determining which renditions to delete is performed in response to determining storage space to store the retrieved rendition is not available.

8. The method of claim 1, wherein the rendition comprises original content, a thumbnail of the content, or a resized version of the content.

9. The method of claim 1, wherein the resource management caches manages generation of renditions on other computing devices based on a set of rules.

10. An apparatus comprising:
    one or more computer processors; and
    logic encoded in one or more computer readable storage media for execution by the one or more computer processors, and when executed being operable to:
    receive, at a resource manager cache of a first computing device, a request for an item, wherein a plurality of computing devices comprises the first and a second computing device;
    determine, by the resource manager cache, a rendition for the item that should be requested from a plurality of renditions for the item, the rendition being a representation of the item, wherein the plurality of renditions are determined based on a type of the item;
    send, by the resource manager cache, one or more requests to one or more sources for the rendition, wherein the one or more sources are chosen from among a plurality of sources on the plurality of computing devices;
    if a source from the one or more sources responds with an indication that the rendition is available, access the rendition by the computing device;
    if no sources from the one or more sources respond with an indication that the rendition is available, perform:
    determine a source from the one or more sources for generating the rendition by using rules to determine that the second computing device having the determined source thereon is capable of generating the rendition;
    send, by the computing device, a message asking if the determined source can generate the rendition from another rendition of the item; and
    receive the rendition if the determined source generated the rendition from another rendition of the item.

11. The apparatus of claim 10, wherein the logic when executed is further operable to send a guidance message to a source in the one or more sources providing guidance on which renditions of items to store on the one or more sources.

12. The apparatus of claim 11, wherein the logic when executed is further operable to provide information to the source on how to obtain the renditions of items to store.

13. The apparatus of claim 12, wherein logic operable to obtain the renditions comprises logic operable to retrieve the renditions from another source or generating of the renditions by the source.

14. The apparatus of claim 11, wherein the guidance is provided before the request for the item is received.

15. The apparatus of claim 10, wherein the logic when executed is further operable to:
    monitor available storage space for the computing device;
    determine which renditions that are stored should be deleted based on the available storage space; and
    delete the determined renditions.

16. The apparatus of claim 15, wherein logic operable to determine which renditions to delete is performed in response to determining storage space to store the retrieved rendition is not available.

17. The apparatus of claim 10, wherein the rendition comprises original content, a thumbnail of the content, or a resized version of the content.

18. The apparatus of claim 10, wherein the resource management caches manages generation of renditions on other computing devices based on a set of rules.

19. A system comprising:

a plurality of computing devices, wherein each computing device includes a resource management cache, the resource management cache being configured to:

receive a request for an item;

determine a rendition for the item that should be requested from a plurality of renditions for the item, the rendition being a representation of the item, wherein the plurality of renditions are determined based on a type of the item;

send one or more requests to one or more sources for the rendition, wherein the one or more sources are chosen from among a plurality of sources on the plurality of computing devices;

if a source from the one or more sources responds with an indication that the rendition is available, access the rendition;

if no sources from the one or more sources respond with an indication that the rendition is available, perform:

determine a source from the one or more sources for generating the rendition by using rules to determine that another computing device having the determined source thereon is capable of generating the rendition;

send a message asking if the determined source can generate the rendition from another rendition of the item; and receive the rendition if the determined source generated the rendition from another rendition of the item.

20. The system of claim 19, wherein the resource management cache of a first computing device in the plurality of computing devices manages generation of renditions for other computing devices in the plurality of computing devices.

* * * * *

UNITED STATES PATENT AND TRADEMARK OFFICE
CERTIFICATE OF CORRECTION

| | | |
|---|---|---|
| PATENT NO. | : 8,219,753 B2 | Page 1 of 1 |
| APPLICATION NO. | : 12/502049 | |
| DATED | : July 10, 2012 | |
| INVENTOR(S) | : Steve Burnap et al. | |

It is certified that error appears in the above-identified patent and that said Letters Patent is hereby corrected as shown below:

Title Page
Column 1

Section (12) DELETE "Bumap" INSERT -- Burnap --

Section (75) DELETE "Inventors: Steve Bumap, Walnut Creek,CA (US);
        Joshua Shagan, San Francisco, CA (US);
        Steve Szabo, San Francisco, CA (US);
        Nicholas Trotta, San Francisco, CA (US)"
    INSERT -- Inventors: Steve Burnap, Walnut Creek, CA (US);
        Joshua Shagan, San Francisco, CA (US);
        Stephan Szabo, San Francisco, CA (US);
        Nicholas Trotta, San Francisco, CA (US) --

Signed and Sealed this
Twenty-seventh Day of November, 2012

David J. Kappos
*Director of the United States Patent and Trademark Office*